United States Patent [19]

Argent

[11] Patent Number: 4,897,853

[45] Date of Patent: Jan. 30, 1990

[54] REFRACTORY CERAMIC ELECTRODE

[75] Inventor: Ronald D. Argent, Allison Park, Pa.

[73] Assignee: King, Taudevin & Gregson (Holdings)Limited, Sheffield, United Kingdom

[21] Appl. No.: 200,710

[22] Filed: Jun. 1, 1988

[51] Int. Cl.4 .............................................. C03B 5/027

[52] U.S. Cl. ...................................................... 373/36

[58] Field of Search ............................... 373/36, 37, 38

[56] References Cited

U.S. PATENT DOCUMENTS 3,576,385 4/1971 Robinson .............................. 373/36

4,110,545 8/1978 Shaw et al. ........................... 373/36

*Primary Examiner*—Roy N. Envall, Jr.

*Attorney, Agent, or Firm*—Shoemaker and Mattare, Ltd.

[57] ABSTRACT

An advanceable refractory ceramic electrode is provided for use in the electrical heating of a molten mass in a furnace. The electrode has a tubular ceramic body having a terminal region that in use is immersed in the molten mass and a basal region that in use fits sealingly into the lining. A core is a close fit into the electrode body and projects from one end thereof. At least the outer surface of the core is of a metal that is non-reactive with the material of the refractory ceramic electrode at the temperature of the molten mass and that is itself molten at said temperature so that in use of the electrode the metal in the terminal region melts and establishes an intimate contact between the core and the electrode body. A connector comprises a socket in which core projecting from the electrode body fits to establish a current path to the electrode and a sleeve surrounding the socket and defining an abutment for the electrode body. A jack is provided for operative connection between the connector and support so as to advance the electrode into the furnace. The electrode body is preferably of fired tin oxide and the core may be at least one rod or tube of fired tin oxide coated on its outer surface with metallic silver.

9 Claims, 8 Drawing Sheets

REFRACTORY CERAMIC ELECTRODE

FIELD OF THE INVENTION

This invention relates to a refractory ceramic electrode for use in the electric heating of molten masses and to a furnace fitted with one or more of such electrodes.

BACKGROUND OF THE INVENTION

U.S. Pat. No. 3391326 (Penberthy) describes and claims a connection between and electrical conductor and a refractory ceramic electrode for use in the electrical heating of molten masses, such as glass, wherein contact between the metal conductor and the ceramic electrode is made by means of a metal which has been made molten to wet into good electrical contact with the electrode. The electrode is in practice made of moulded and fired tin oxide. The practical forms of the Penberthy electrode are neither advanceable nor extendible, and since a tin oxide electrode is subject to erosion, it must be replaced a number of times during the service life ("campaign") of the furnace. A structure for a tin oxide electrode that is said to be applicable to both vertical and horizontal electrodes and not to rupture or break during continuous operation is described in U.S. Pat. No. 3826858 (Pieper) and employs a contact cup that is pushed against the end of the electrode by means of a ram. An end bored ceramic electrode structure fitted with a contact plug in the form of a sleeve of silver filled with a plug of the same ceramic material as the electrode is described in U.S. Pat. No. 41105545 (Shaw et al).

Patent Specification No. GB-A-1481406 (Elemelt) describes a rod-type electrode of tin oxide made in parts that interfit together endwise with optionally connection between adjacent sections being established by silver or silver alloy, but the individual sections of electrode are solid and there is no provision for a metallic current path from base to adjacent the working tip of the electrode. The Element electrode is not stated to be advanceable or extendible.

Tin oxide electrodes constructed according to the principles described in Pat. No. 3391237 (Penberthy) have been used by Penelectro/KTG since the late 1960's in electric furnaces for melting lead crystal-type glasses. These furnaces generally make not more than 35 tons of glass per day, and most of them make not more than 15 tons per day. That there is a barrier to the increase in size of an individual furnace will be apparent from the fact that there is in excess of 750 tons of electrically melted lead glass produced per day.

SUMMARY OF THE INVENTION

This invention is based on the realisation that the use of an advanceable tin oxide electrode can offer a furnace owner a potential to spread his tin costs throughout the furnace campaign and offers the potential for extended campaigns of twelve to fifteen years without shutdowns, and for the construction of furnaces of larger size since there is an ability to look at much larger furnaces.

It is an object of the invention to provide a structure for an advanceable tin oxide electrode.

It is a further object of the invention to provide a structure for a tin oxide electrode that combines the capacity for the electrode to be advanced into the furnace with the capacity for additional sections to be added as the electrode advances so that the whole of the electrode material needed in a furnace campaign does not have to be present at the outset of the campaign.

It is a further object of the invention to provide advanceable tin oxide electrodes of simple structure in which electrical contact to the hot tip region of the electrode is made through a molten metal such as molten silver.

It is a further object of the invention to provide a structure for a tin oxide electrode that allows the electrode to be made in water-cooled and non water-cooled forms.

It is a further object of the invention to provide a structure for a tin oxide electrode that enables sections of electrode to be added as the electrode advances, so that the initial capital cost of the tin in the electrode is relatively small and the costs of the tin in the added sections can be spread through the furnace campaign as the electrode is consumed.

It is a further object of the invention to provide a structure for a tin oxide electrode that enables sections of electrode to be added as the electrode advances, and in which the added sections employ a metal meltable at furnace temperatures such as silver to provide the current path through the or each added section.

It is a further object of the invention to provide a structure for a tin oxide electrode that provides for measurement of the length of electrode immersed in the glass.

According to the invention, there is provided a refractory ceramic electrode for use in the electrical heating of a molten mass in a furnace having a refractory lining, said electrode comprising:

a tubular ceramic electrode body having a terminal region that in use is immersed in the molten mass and a basal region that in use fits sealingly into the refractory lining;

a core that is a close fit into the electrode body and projects from one end thereof, at least the outer surface of the core being of a metal that is non-reactive with the material of the refractory ceramic electrode at the temperature of the molten mass and which is itself molten at said temperature so that in use the metal in the terminal region of the electrode melts and establishes an intimate contact between the core and the electrode body;

a connector for use as a replacement section of the electrode comprising a socket in which the core projecting from the electrode body fits to establish a current path to the electrode and a sleeve surrounding the socket and defining an abutment for the electrode body; and jacking means for operative connection between the connector and a support so as to advance the electrode into the furnace.

There is also provided a glass melting furnace having one or more electrodes as aforesaid.

BRIEF DESCRIPTION OF THE DRAWINGS

Various forms of the invention and their relationship to the prior art will now be described, by way of non-limiting illustration, with reference to the accompanying drawings, in which.

Figure 4:
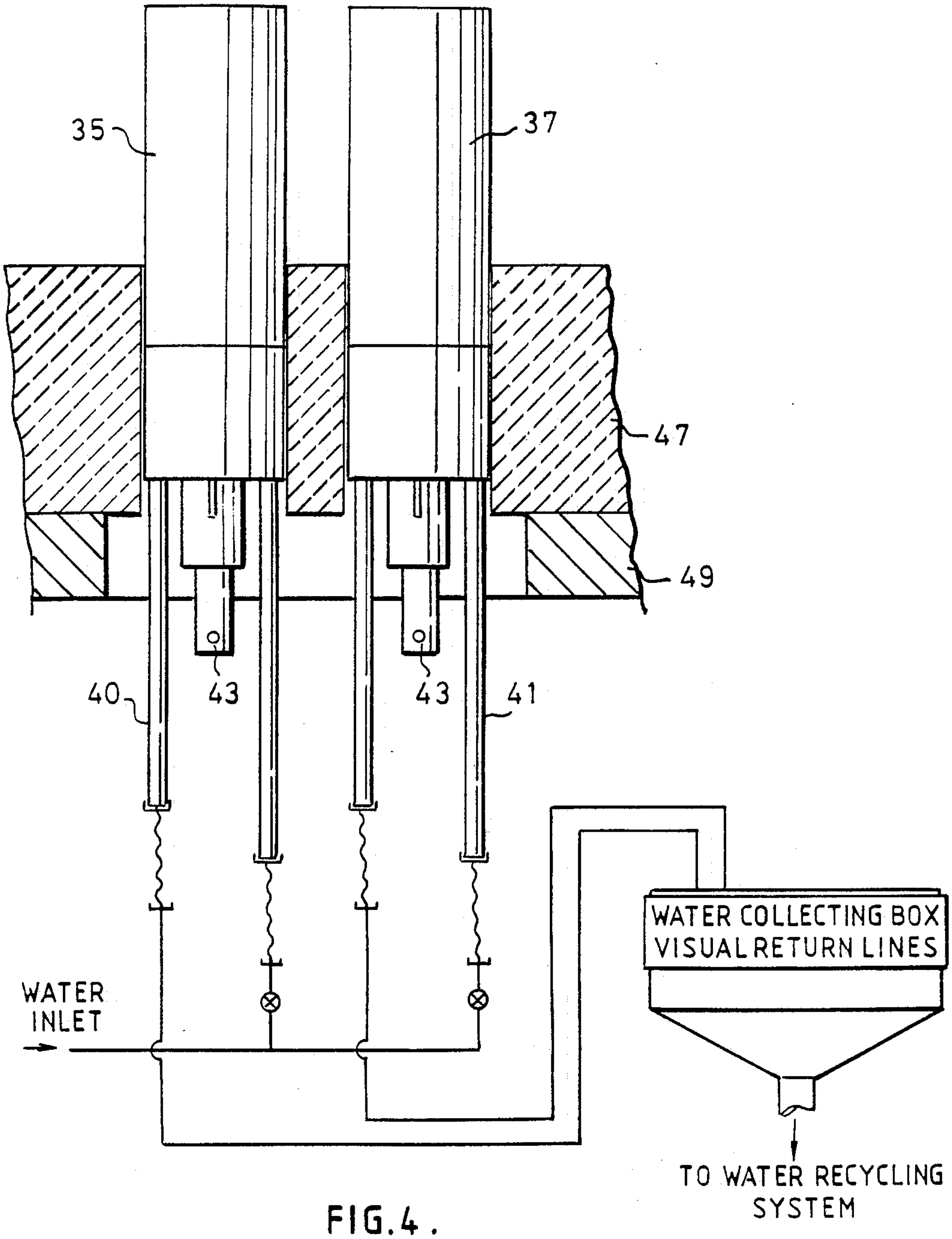
FIG. 4 is a fragmentary section of a glass melting furnace whose base is provided with a pair of electrodes as shown in FIG. 3.

FIG. *7a* is a plan of a water box and electrode connector sub-assembly forming part of the electrode of FIG. 4, FIG. *7b* is a transverse section in the plane B—B (FIG. *7d*), FIG. *7c* is an underneath view and FIGS. *7d–7f* are longitudinal sections in the planes A—A, C—C and D—D (FIG. *7b*) respectively, an unextended electrode being shown in place in the connector sub-assembly in FIG. *7d;*

Figure 8:
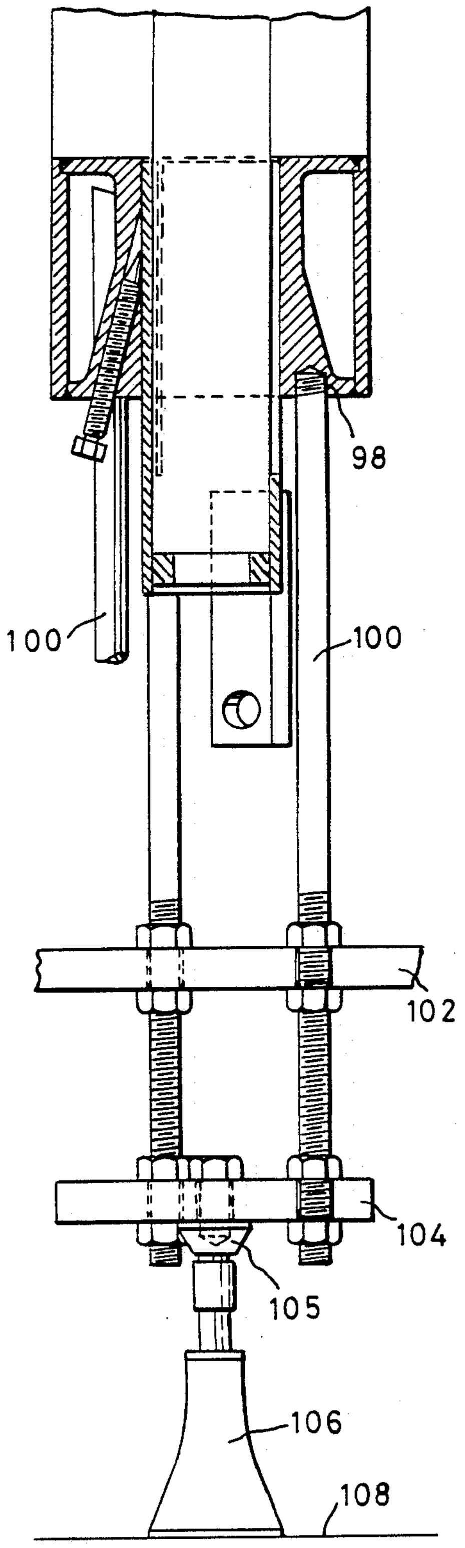
Figure 9:
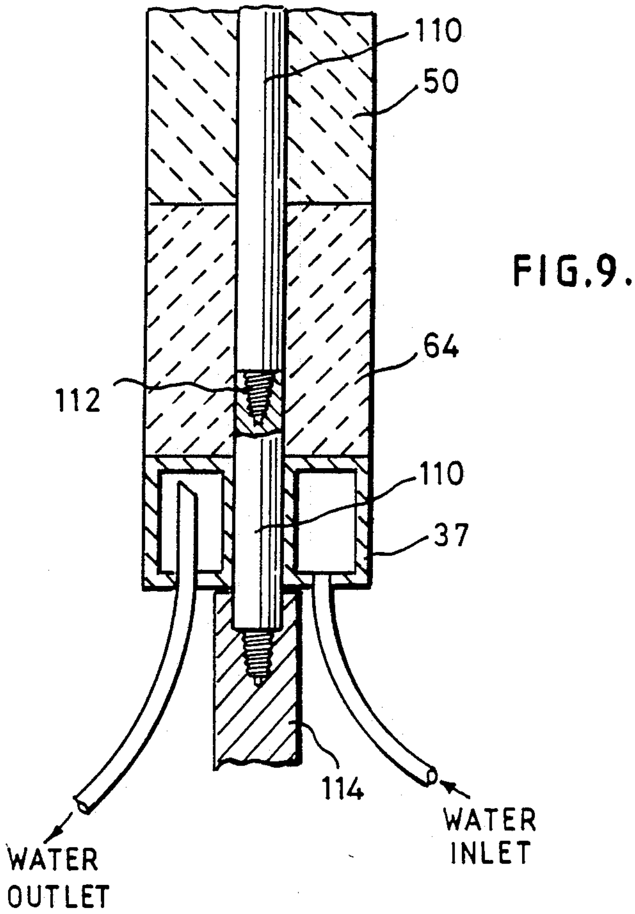

FIG. 8 is a side elevation of part of the electrode of FIG. 4 with the water box and electrode connector subassembly in longitudinal section in the plane E—E (FIG. *7b*) and also showing in side elevation a jacking mechanism attached thereto; and FIG. 9 is a diagram of a second form of the electrode.

DETAILED DESCRIPTION OF PREFERRED FORMS OF THE INVENTION

Figure 1:
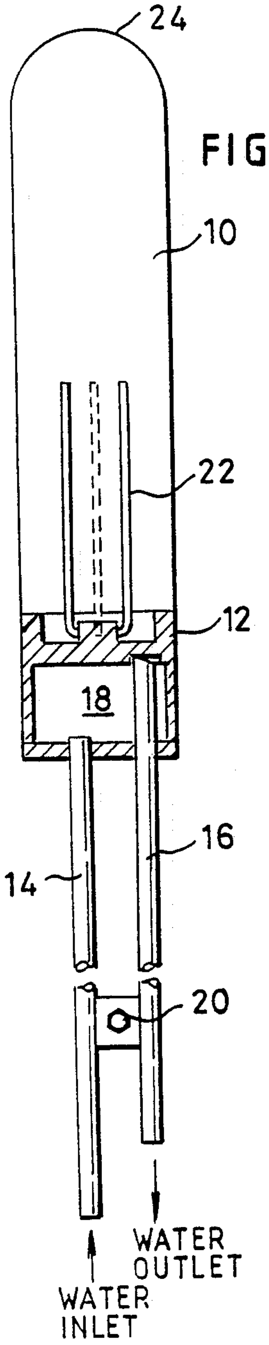
FIG. 1 is a diagrammatic longitudinal section of a first form of tin oxide electrode according to the prior art.
Figure 2:
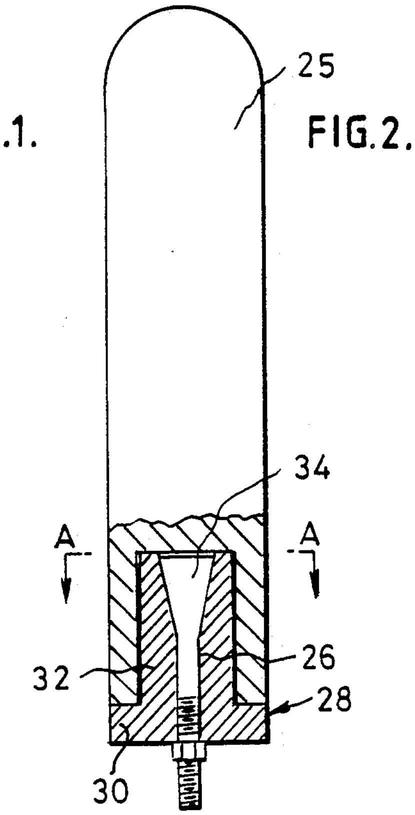
FIGS. 2 and 2*a* are respectively a diagrammatic longitudinal section and a diagrammatic transverse section on the line A—A of FIG. 2 of a second form of tin oxide electrode according to the prior art.
Figure 2A:
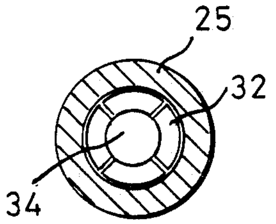

FIG. 1 shows the structure of one form of tin oxide electrode that has been made by KTG since the late 1960's. A tin oxide rod 10 extends from a so-called pot connector 12, with the latter having an internal space 18 through which a flow of water takes place from inlet 14 to outlet 16. The water inlet and outlets are metal pipes that also serve to establish an electrical connection to the electrode at 18. The electrode 10 is formed with a multiplicity of bores in which there are silver rods 22, the portions of the silver towards the tips of the rod melting during use of the electrode to assist the establishment of a low-resistance current path between the electrical connection 12 and the hot tip 24 of the electrode. The use of the water-cooled pot connector 12 is not essential but is considered to be advantageous in that it can help to retard refractory corrosion, which is particularly significant in a shelf-type furnace where the refractories are prone to downward drilling in the vicinity of the electrodes. A second form of electrode is shown in FIG. 2 and shows a tin oxide rod 25 having a cavity 26 at its base which receives a copper connector 28 having a base flange and upstanding collet fingers 32 that are expanded by a conical copper plug 34 to establish a mechanical and electrical connection between the rod 25 and the connector 28. A third form of electrode may be Corning has a base cavity in which there is an internally pinned stud. All three known structures, however, apply power to the electrode in a way that prevents the electrode from being advanced into the furnace as it is being consumed. In order to increase the life of the electrodes, their size has been increased, but there is a corresponding increase in capital cost, and once the electrode has been consumed, it has to be replaced. A typical electrode life is 1.5–3 years while the furnace refractories, with some patching during a furnace campaign, have been known to last twelve years.

The problem of electrode life is not solved by the use of alternative electrode materials such as molybdenum because a reaction takes place between the molybdenum itself and the glass which is normally heavily oxidised. The reaction gives rise to molybdenum in the glass, and causes a proportion of the lead in the glass-making composition in the furnace to revert to its metallic form. Metallic lead therefore has to be drained regularly from the furnace and can also accelerate downward drilling of the refractory lining. It is not uncommon to find that molybdenum melted lead crystal glass is reducing rather than oxidising in its final form.

Figure 3:
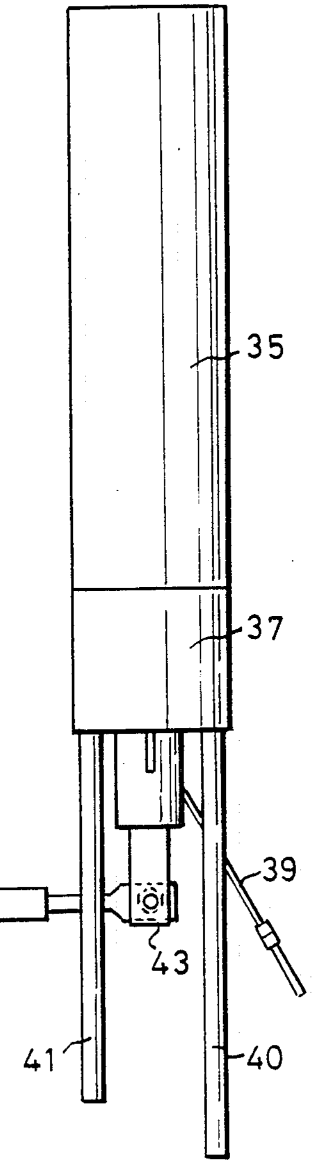
FIG. 3 is a diagrammatic side view of a first form of advanceable electrode and connector assembly according to the invention.

FIG. 3 shows a first form of advanceable tin oxide electrode according to the invention in which an electrode assembly 35 fits at its base end into a water box and electrode holder assembly 37 provided with a thermocouple 39, water supply and return pipes 40, 41 and a terminal 43 for attachment of a power supply cable 45. The electrode will typically be 4–6" (100–150 mm) in diameter depending upon the power level required and its length will depend upon the circumstances of intended use, the proportions illustrated being for a KTG shelf-type furnace. Water cooling, though not essential (see below) is considered desirable because it can reduce refractory corrosion and because it gives some control of the amount of glass that freezes around the tin oxide of the electrode and around the water box and electrode connector assembly 37 which fits into the refractory lining of the furnace. Control of the amount of frozen glass becomes important when it is necessary to break the glass-to refractory and glass-to connector seals when the electrode is to be advanced and a new section added. In FIG. 4 there is seen a pair of electrodes in a furnace having a refractory lining 47 in casing 49. It is noted that the water box and electrode connector assembly 37 takes up a working position in the refractory layer 47.

Figure 5:
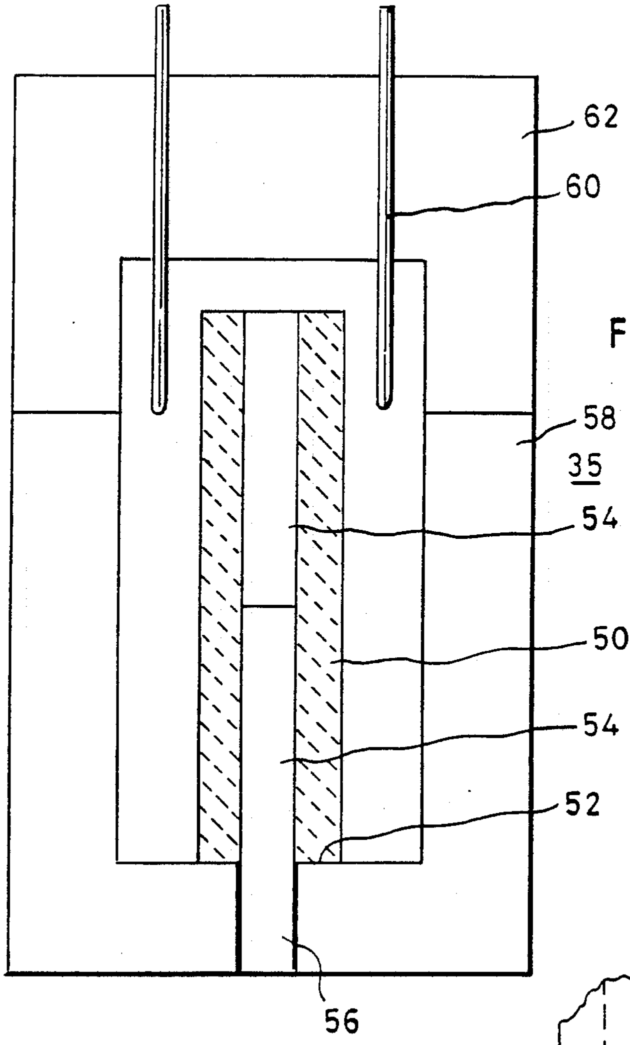
FIG. 5 is a diagram showing a refractory electrode sub-assembly forming part of the electrode of FIG. 4 in a furnace for a silver melting step which forms part of the manufacturing process.

FIG. 5 shows diagrammatically the electrode assembly 35 which comprises an outer sleeve 50 of tin oxide or other refractory material which has an abutment surface 52 at its base end. Sections 54 of inner sleeve or rod 54 of the same refractory material are silver coated and fit into the outer sleeve 50. Each section 54 is slightly more than half the length of the outer sleeve 50. The terminal one of the sections 54 fits into the sleeve 50 with its end flush therewith and the basal one of the sections 54 fits into the sleeve 50 with a basal portion 56 thereof protruding behind the abutment surface 52. Each inner sleeve 54 has a silver coating on its outer wall. Prior to shipment the assembly of the outer sleeve 50 and the two inner sleeves 54 is placed into a furnace 58 having Kanthal elements 60 in a lid 62 thereof. The furnace 58 is heated to a sufficient temperature to melt the silver on the outer surfaces of the inner sleeve 54 so as to establish a good electrical connection to the outer sleeve 50. Desirably the electrical conductivity of all assemblies is tested before they are shipped from the factory.

Figure 6:
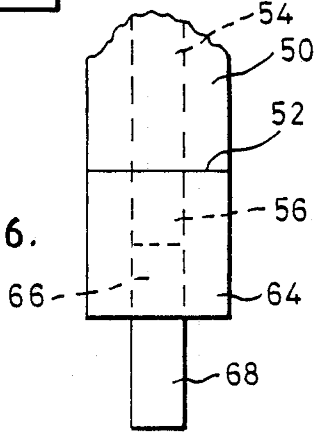
FIG. 6 is a fragmentary view of a basal end of the refractory electrode sub-assembly of FIG. 5 with an extension piece fitted thereto.
Figure 7A:
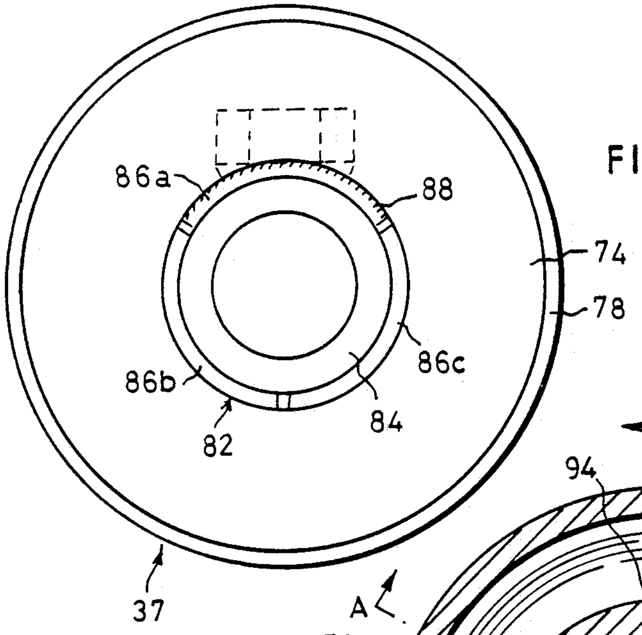
Figure 7B:
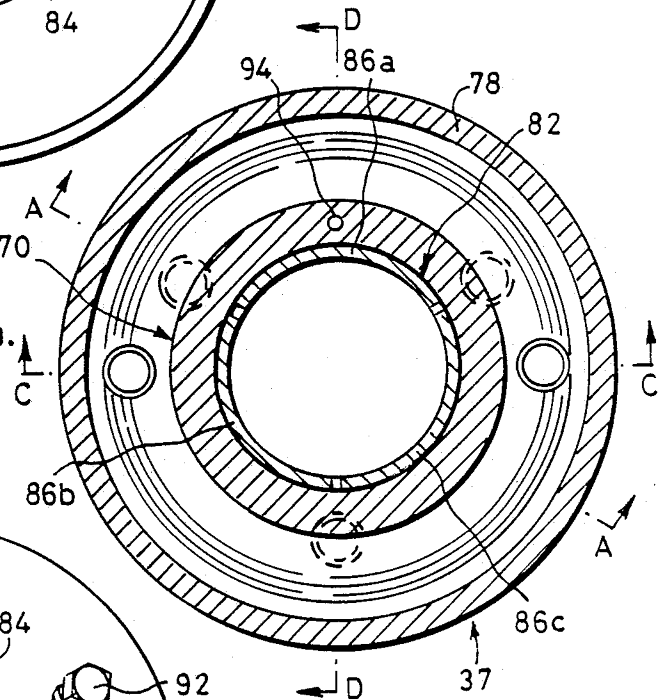
Figure 7C:
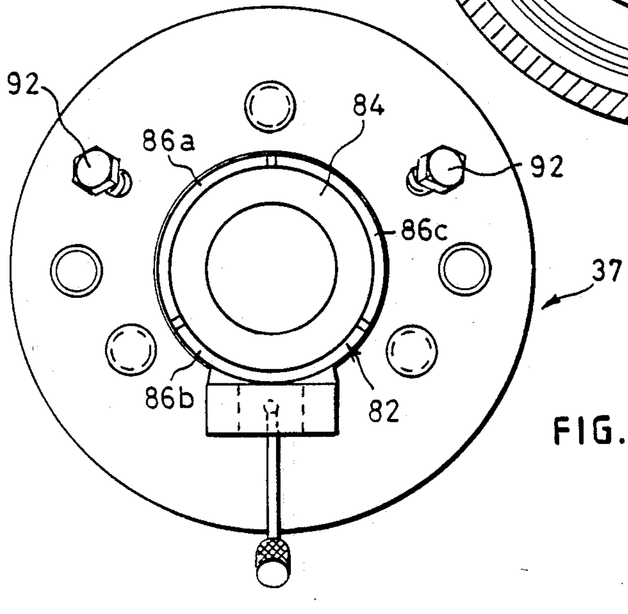
Figure 7D:
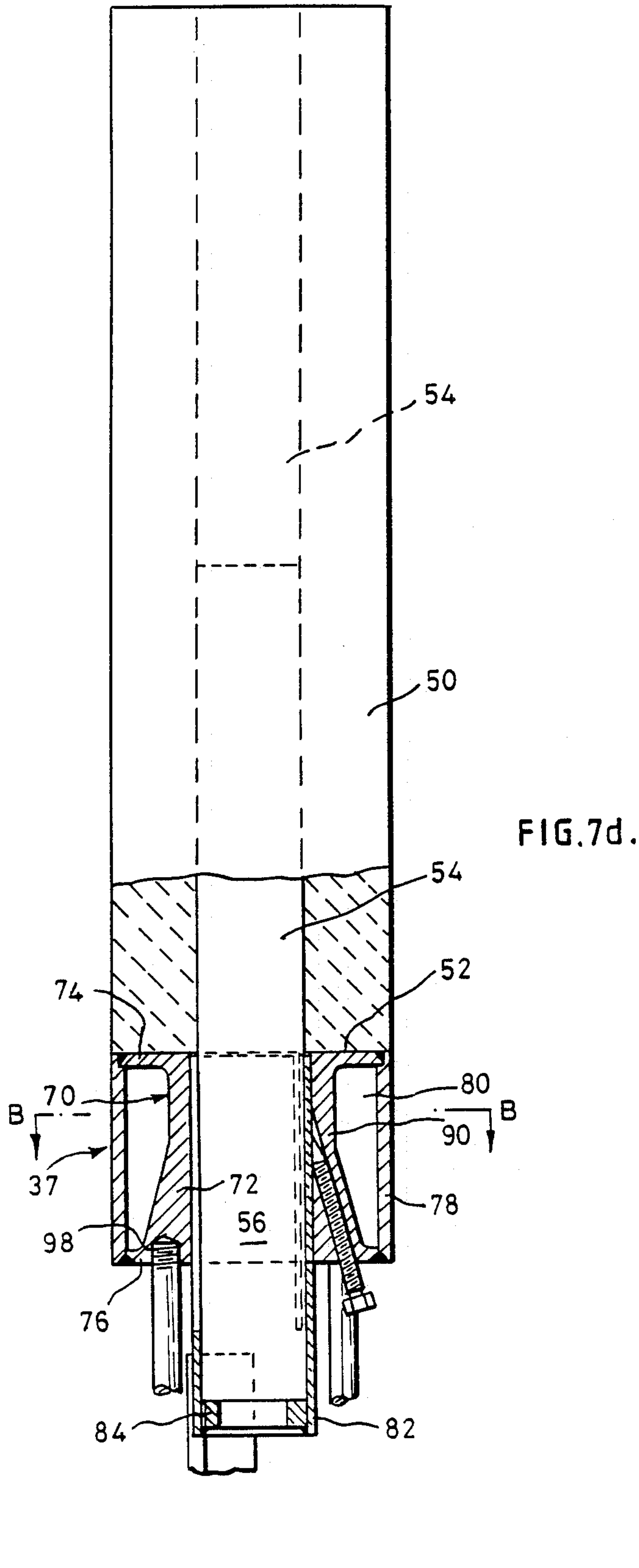
Figure 7F:
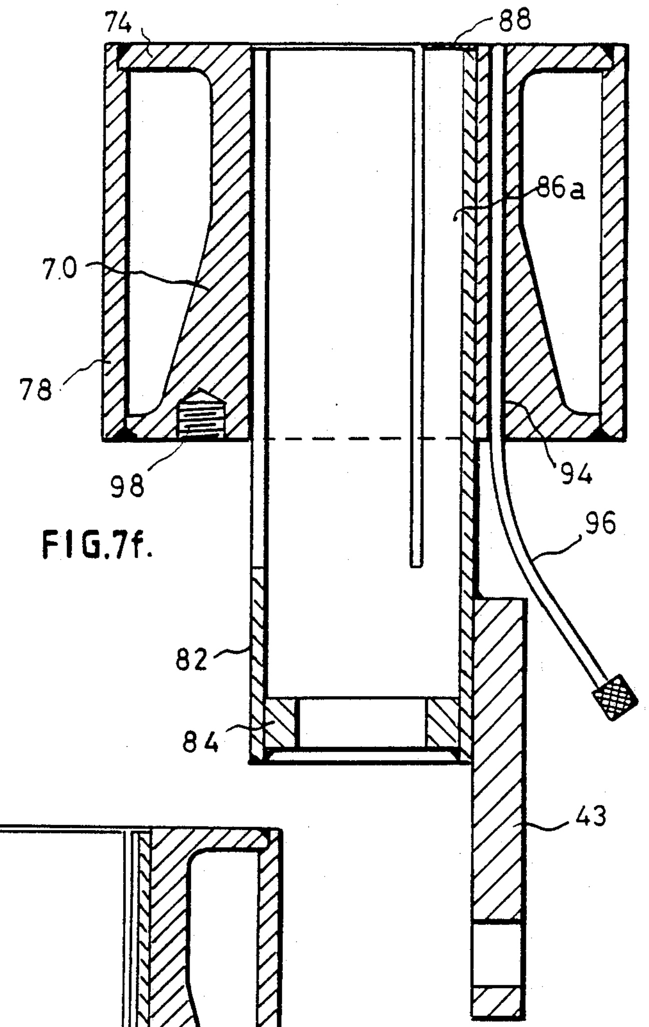
Figure 7E:
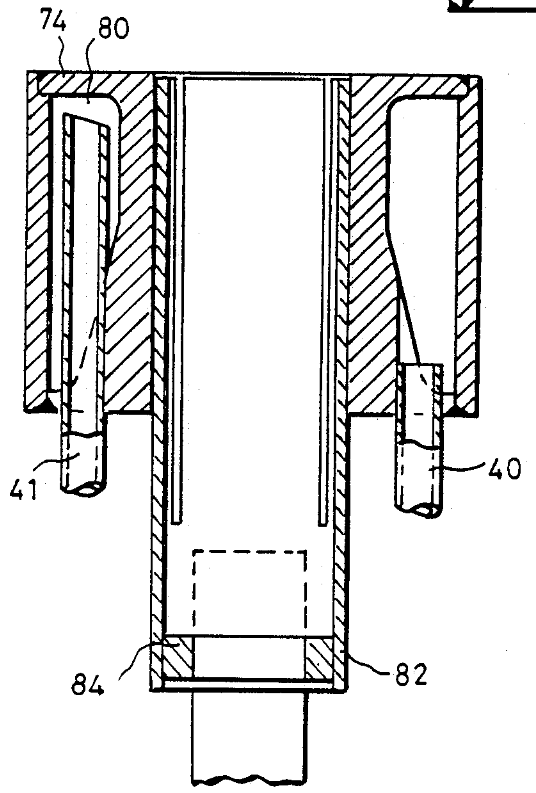

FIG. 6 shows the basal end of an electrode subassembly as described above, with a two-piece extension fitted thereto. A hollow outer sleeve 64 fits onto the protruding basal portion 56 of the inner refractory rod or sleeve 54 and is about twice the length of the protruding portio15 56. An inner rod or sleeve 66 has a silver coated outer surface and is of the same length as the outer sleeve 64. It fits into the bore in the sleeve 64 and has a protruding basal portion 68 which is of the same length as the protruding portion 56 of inner rod or sleeve 54. Addition of the extension has left the shape of the electrode at its base unaffected, and extensions can be added to the electrode one after the other indefinitely as the furnace campaign proceeds. Furthermore, the staggered relationship of the junctions of the inner rods or sleeves 54, 66 and the outer sleeves 50, 64 gives good mechanical strength to the electrode.

In FIG. *7d,* the water box and electrode connector sub-assembly comprises a generally tubular body 70 having a divergent conical lower end portion 72 and upper and lower end flanges. The upper flange 74 provides an abutment for the end face 52 of the outer refractory sleeve 50. A cylindrical cover 78 having the same external diameter as the outer refractory sleeve 50 is welded between the flanges 74, 76 and defines with the body 70 a chamber 80 fed with circulating water through supply pipe 40 and return pipe 41 (FIG. *7e*). The basal region 56 of the inner sleeve 54 (or when an extension piece has been fitted basal portion 68 of inner rod or sleeve 56) extends through the body 10. It is received in a tubular member 82 having at its base a welded-in support ring 84 that provides an abutment for the basal portion 56 or 68 and has longitudinally directed slits extending from its upper end to define three collect fingers 86*a–c,* one of whcih 86*a* is welded at 88 to the body 70 and the others 86*b, c* of which are free. The terminal 43 (FIG. *7f*) takes the form of a plate welded to the lower portion of the tubular member 82. Threaded inwardly directed bores extend upwardly through flange 76 and through conical portion 72 of the body 70 and receive electrical clamping bolts 92 that act against the fingers 86*b,* 86*c* to collapse the collet about the refractory electrode basal portion 56 or 66 to make a mechanical and electrical connection to the silver-coated external surface thereof. As seen in FIG. *7f,* the body 70 is formed with a bore 94 which receives a thermocouple that extends to the top flange 74 and makes contact with the base of the sleeve 50. Assuming a constant temperature of furnace operation and in an idealised situation where the furnace refractories are not eroded, the temperature sensed by the thermocouple depends on the length of immersed electrode. Change in the thermocouple temperature is significant of change in immersed electrode length and can be used to try to maintain a substantially constant length of electrode immersed in the molten glass.

For advancing the electrode into the furnace or withdrawing the water box and electrode connector assembly 37, there is provided jacking means operatively connected or connectible to the assembly 37. As seen in FIGS. *7d, 7f* and 8 the lower end flanges 76 of the body 70 is formed with threaded blind bores to receive the upper ends of jacking links 100. The links 100 are bolted to upper and lower spreader plates 102, 104 and the lower spreader plate is connected to the moving part 105 of a screw jack 106 anchored to a support 108. The jacking device of FIG. 8 can be used (a) to pull out the water box and electrode connector assembly 37, (b) to push in a tin oxide electrode extension 64, 68 and (c) to return the connector assembly 37 into place.

The electrode structure described above can be modified to delete the water-cooling feature. In that case, a solid block of metal replaces the fabricated body 72 and cover 78.

FIG. 9 shows a further form of the electrode of the invention in which the refractory central rod 54, 66 is replaced by a solid silver internal rods 110 connected end to end by threaded connections 112. The Lowermost rod 110 is connected to a stainless steel extension piece 114 which serves to permit an electrical connection to be made. Other forms of connection between the rods 110 e.g. mechanically interlocking interconnections that are a push fit together with may also be used.

I claim:

1. A refractory ceramic electrode for use in the electrical heating of a molten mass in a furnace having a refractory lining, said electrode comprising:

a tubular ceramic electrode body having a terminal region that in use is immersed in the molten mass and a basal region that in use fits sealingly into the refractory lining;

a core that is a close fit into the electrode body and projects from one end thereof, at least the outer surface of the core being of a metal that is non-reactive with the material of the refractory ceramic electrode at the temperature of the molten mass and which is itself molten at said temperature so that in use the metal in the terminal region of the electrode melts and establishes an intimate contact between the core and the electrode body;

a connector for use as a replacement section of the electrode comprising a socket in which the core projecting from the electrode body fits to establish a current path to the electrode and a sleeve surrounding the socket and defining an abutment for the electrode body; and jacking means for operative connection between the connector and a support so as to advance the electrode into the furnace.

2. The electrode of claim 1, wherein the electrode body is of fired tin oxide.

3. The electrode of claim 2, wherein the core is at least one rod or tube of fired tin oxide coated on its outer surface with metallic silver.

4. The electrode of claim 3, wherein the basal end of the electrode has an abbreviated section of electrode body and core that fits onto and is supported by an overlying section of core and is an addition made after installation of the electrode into the furnace.

5. The electrode of claim 1, wherein the core comprises sections of metal rod threadedly connected together, at least the terminal section of the rod being meltable at the temperature of the molten mass.

6. The electrode of claim 1, wherein the sleeve has an internal cavity, means being provided for circulating cooling water through said cavity.

7. The electrode of claim 1, wherein the connector includes a thermocouple that contacts the electrode body for measuring the temperature of said body adjacent the connector.

8. The electrode according to claim 1, wherein the socket includes collect means in which the core projecting from the electrode body fits and means for collapsing the collet onto the core to establish mechanical and electrical connections thereto.

9. The electrode of claim 9 in which a single segment of said collet means is attached to the sleeve.

* * * * *